(12) United States Patent
MacDonald

(10) Patent No.: US 9,488,672 B2
(45) Date of Patent: Nov. 8, 2016

(54) DUAL CHANNEL ACCELEROMETER AND METHOD OF MANUFACTURING THE SAME

(71) Applicant: ROLLS-ROYCE PLC, London (GB)

(72) Inventor: Andrew Peter MacDonald, Gloucester (GB)

(73) Assignee: ROLLS-ROYCE plc, London (GB)

(*) Notice: Subject to any disclaimer, the term of this patent is extended or adjusted under 35 U.S.C. 154(b) by 367 days.

(21) Appl. No.: 14/219,369

(22) Filed: Mar. 19, 2014

(65) Prior Publication Data
US 2014/0305133 A1 Oct. 16, 2014

(30) Foreign Application Priority Data
Apr. 15, 2013 (GB) .................... 1306757.4

(51) Int. Cl.
*G01P 15/09* (2006.01)
*F02C 9/00* (2006.01)

(52) U.S. Cl.
CPC ............... *G01P 15/09* (2013.01); *F02C 9/00* (2013.01); *G01P 15/0907* (2013.01); *Y10T 29/42* (2015.01)

(58) Field of Classification Search
CPC . G01P 15/0907; G01P 15/0915; G01P 15/09
USPC ................ 73/514.34, 654; 310/329
See application file for complete search history.

(56) References Cited

U.S. PATENT DOCUMENTS

| | | | |
|---|---|---|---|
| 3,566,163 A * | 2/1971 | Fischer | G01L 1/16 310/329 |
| 4,586,377 A | 5/1986 | Schmid | |
| 5,052,226 A | 10/1991 | Schmid | |
| 5,117,696 A | 6/1992 | Schmid | |
| 6,655,211 B1 * | 12/2003 | Schmid | G01P 15/0915 310/329 |
| 9,057,655 B2 * | 6/2015 | Broillet | G01H 11/08 |
| 9,164,122 B2 * | 10/2015 | Walling | G01P 15/0907 |
| 9,217,680 B2 * | 12/2015 | Kamiya | B25J 9/00 |

FOREIGN PATENT DOCUMENTS

| | | |
|---|---|---|
| EP | 0 316 498 A1 | 5/1989 |
| GB | 2492798 A | 1/2013 |
| WO | WO 88/07664 A1 | 10/1988 |

OTHER PUBLICATIONS

Search Report issued in European Patent Application No. 14 16 0488 dated Jun. 23, 2014.
Search Report issued in British Application No. 1306757.4 dated Oct. 29, 2013.

* cited by examiner

*Primary Examiner* — Helen Kwok
(74) *Attorney, Agent, or Firm* — Oliff PLC

(57) ABSTRACT

A dual output accelerometer having first and second output channels, comprises a supporting base, a first transducer comprising a plurality of inter-connected first piezoelectric elements, a second transducer comprising a plurality of inter-connected second piezoelectric elements and a seismic mass.

Each of the first piezoelectric elements and the second piezoelectric elements are interleaved with one another, and are co-located with the seismic mass, the co-located first and second piezoelectric elements and the seismic mass being fastened to the supporting base by a rigid mechanical coupling. The interleaved first and second piezoelectric elements provide an improved first output channel to second output channel matching.

12 Claims, 2 Drawing Sheets

DUAL CHANNEL ACCELEROMETER AND METHOD OF MANUFACTURING THE SAME

This invention claims the benefit of UK Patent Application No. 1306757.4, filed on 15 Apr. 2013, which is hereby incorporated herein in its entirety.

FIELD OF THE INVENTION

The present invention relates to accelerometers and particularly, but not exclusively, to dual channel accelerometers together with methods of manufacturing the same.

BACKGROUND TO THE INVENTION

Accelerometers are used for measuring levels of vibration in many different types of machinery. In many applications, such as for example aircraft engines, there is a need for duplicate measurements of vibration level in order to provide a level of redundancy in case of sensor failure.

It is therefore known to use dual channel accelerometers in such redundant applications. Various arrangements of dual channel accelerometer are known.

One such arrangement 10, shown in FIG. 1, employs two single channel accelerometers 12, 14 mounted side by side within a common housing 22. This has the advantage of being simple and is therefore a low cost solution.

However, ensuring that both accelerometers 12, 14 experience the same acceleration in a vibration environment is difficult. One reason for this difficulty is that the two accelerometers 12, 14 must necessarily be spaced apart from one another and thus cannot experience exactly the same vibration.

In addition, twisting or flexure of the baseplate 20 on which the two accelerometers 12, 14 are mounted further exacerbates the difference in vibration input to each of the accelerometers 12, 14. Thus, consistent channel-to-channel matching is difficult to achieve.

An alternative arrangement 30, shown in FIG. 2, is to position the two single channel accelerometers 32, 34 on top of each other. This arrangement has the advantage that both accelerometers 32, 34 now experience the same vibration input. However, differences remain between the vibration inputs to each of the two accelerometers 32, 34.

This is because bending of the accelerometer stack caused by lateral movement of the baseplate 38 causes the upper accelerometer 34 to experience a different vibration input to that experienced by the lower accelerometer 32.

STATEMENTS OF INVENTION

According to a first aspect of the present invention there is provided a dual output accelerometer having first and second output channels, comprising:
  a supporting base;
  a first transducer comprising a plurality of inter-connected first piezoelectric elements;
  a second transducer comprising a plurality of inter-connected second piezoelectric elements; and
  a seismic mass,
    wherein each of the first piezoelectric elements and the second piezoelectric elements are interleaved with one another, and are co-located with the seismic mass, the co-located first and second piezoelectric elements and the seismic mass being fastened to the supporting base by a rigid mechanical coupling.

A piezoelectric sensing element commonly comprises a plurality of discs of piezoelectric material that are stacked together, usually with a common centre peg co-locating the discs together.

In the present invention, the individual discs of piezoelectric material making up two sensing elements are separated and then interleaved with one another and co-located with a single seismic mass.

In this way, any variation in vibration input resulting from the bending of the stack of piezoelectric elements will be distributed over the first and second piezoelectric elements. This will improve the channel-to-channel matching of the first and second transducers over a dual channel accelerometer of the prior art.

Optionally, the first output channel is connected to the plurality of inter-connected first piezoelectric elements, and the second output channel is connected to the plurality of inter-connected second piezoelectric elements.

Each of the first output channel and second output channel comprises signals generated from a plurality of individual respective first and second piezoelectric elements that are distributed over the length of the stack of piezoelectric elements. This reduces the adverse influence of out-of-plane movement of the dual channel accelerometer on the channel-to-channel matching of the first and second output signals.

Optionally, each of the first piezoelectric elements and the second piezoelectric elements are alternately interleaved with one another.

By alternately interleaving first and second piezoelectric elements, the first and second channels receive signal contributions from the entire length of the sensing element stack. This minimises the influence of bending of the sensing stack on the channel-to-channel matching of the first and second output signals. This in turn provides for closer matching between the first and second output signals thereby improving the redundancy of the dual channel accelerometer.

In other arrangements, the interleaving of first and second piezoelectric elements may take other interleaving patterns.

In one such arrangement, the stack of piezoelectric elements may comprise, in sequence, two first piezoelectric elements, one second piezoelectric element, one first piezoelectric element and two second piezoelectric elements. This sequence may itself then be repeated.

This asymmetric arrangement may be utilised to provide an indication of 'out of plane' movements while still providing a balanced and matched measure of in-plane accelerations.

Optionally, the quantity of first piezoelectric elements is equal to the quantity of second piezoelectric elements.

Having identical quantities of first and second piezoelectric elements simplifies the calibration of the dual channel accelerometer.

In another arrangement the first piezoelectric elements are formed from a first piezoelectric material while the second piezoelectric elements are formed from a second piezoelectric material. The interleaving arrangement will still help to reduce variations in mechanical input to the individual stacks.

The first piezoelectric material may be selected for improved high frequency response while the second piezoelectric material may be selected for improved low frequency response. This would allow the first piezoelectric elements to provide a primary measurement of acceleration at high frequencies with the second piezoelectric elements providing a corresponding secondary 'cross-check' measurement. Likewise the second piezoelectric elements would then be used for a primary measurement of acceleration at low frequencies with the first piezoelectric elements acting as a secondary 'cross-check' measure.

In such an arrangement, the material properties (electro-mechanical coupling coefficient, electrical impedance, acoustic impedance, etc.) of the first and second piezoelectric materials will be different to one another and thus the quantity of first piezoelectric elements may differ from the quantity of second piezoelectric elements.

Optionally, the dual channel accelerometer further comprises a casing fixed to the supporting base.

The casing protects the first and second transducers from mechanical and environmental damage.

Optionally, the seismic mass comprises the rigid mechanical coupling between the co-located first and second piezoelectric elements and the supporting base.

This simplifies the construction of the dual channel accelerometer making it easier and cheaper to manufacture and thus more convenient for a user.

Optionally, the rigid mechanical coupling is a threaded fastener, the threaded fastener passing through the co-located first and second piezoelectric elements, and being threadingly connected to the supporting base.

The use of a separate fastener to secure the seismic mass and the piezoelectric elements to the supporting base enables the seismic mass to be formed in the optimum manner without it having to serve a locating and securing function.

According to a second aspect of the present invention there is provided a method of manufacturing a dual channel accelerometer, the method comprising the steps of:
  i positioning one or more first piezoelectric elements on a supporting base;
  ii positioning one or more second piezoelectric elements on the one or more first piezoelectric element;
  iii repeating steps i and ii until a predetermined number of first and second piezoelectric elements are interleaved on the supporting base;
  iv positioning a seismic mass on the interleaved first and second piezoelectric elements; and
  v securing the first and second piezoelectric elements and the seismic mass to the supporting base by a rigid mechanical coupling.

Optionally, the dual channel accelerometer further comprises first and second output channels, the method comprising the further steps of:
  vi inter-connecting each of the plurality of first piezoelectric elements;
  vii inter-connecting each of the second piezoelectric elements;
  viii connecting the plurality of first piezoelectric elements to the first output channel; and
  ix connecting the plurality of second piezoelectric elements to the second output channel.

Optionally, each of the first piezoelectric elements and the second piezoelectric elements are alternately interleaved with one another.

Optionally, the rigid mechanical coupling is integrally formed with the seismic mass.

According to a third aspect of the present invention there is provided a gas turbine engine comprising a dual output accelerometer as claimed in either of first and second aspects of the invention, and an engine control system connectable to both output channels of the dual output accelerometer.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
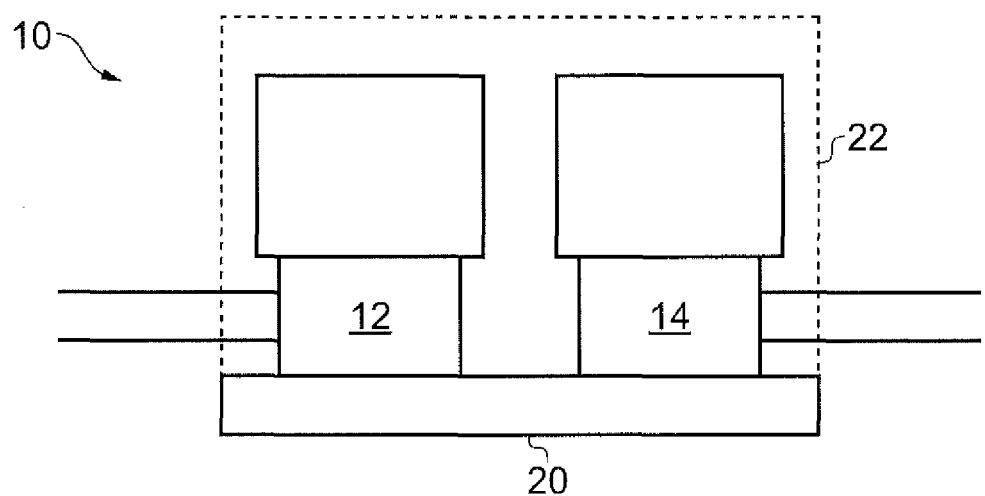
FIG. 1 shows a schematic sectional view of a dual channel accelerometer according to the prior art.
Figure 2:
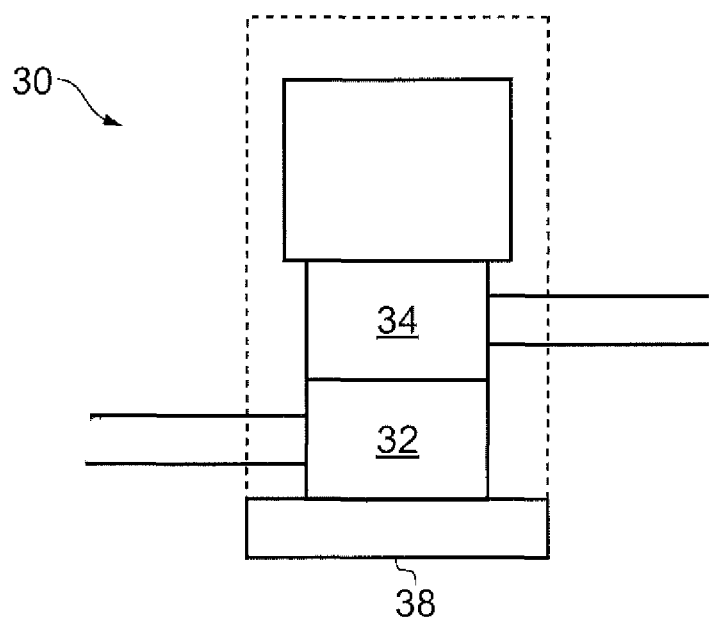
FIG. 2 shows a schematic sectional view of an alternative dual channel accelerometer according to the prior art.
Figure 3:
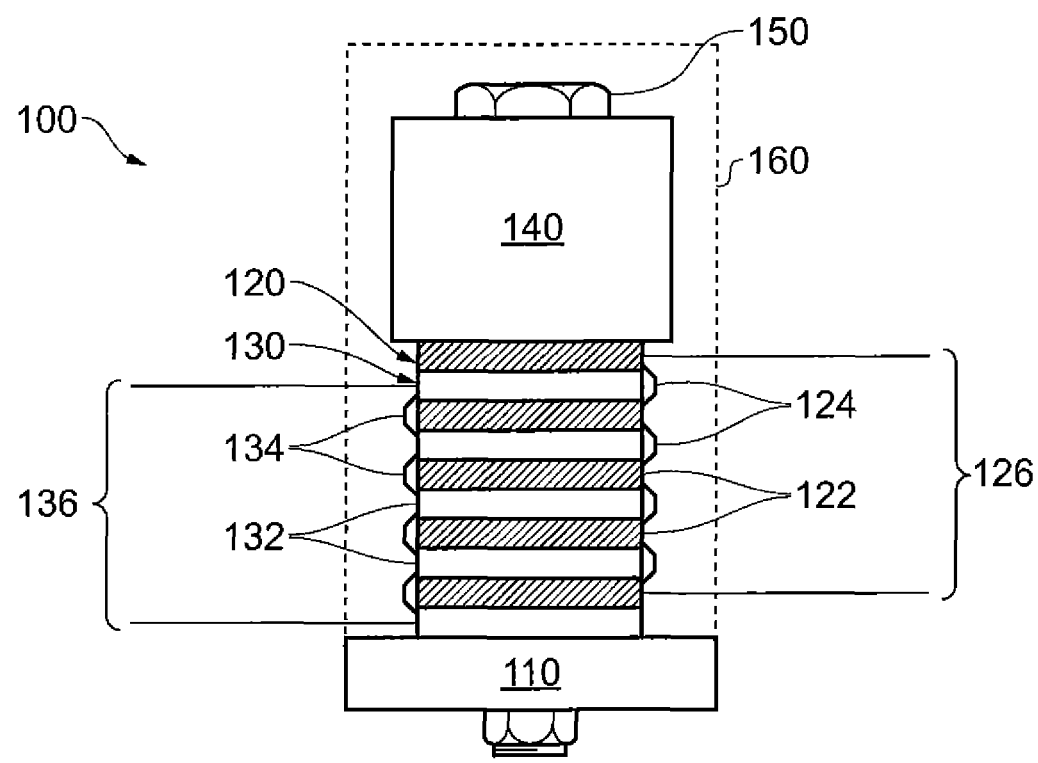
FIG. 3 shows a schematic sectional view of a dual channel accelerometer according to a first embodiment of the invention.

Referring to FIG. 3, a dual channel accelerometer according to a first embodiment of the invention is designated generally by the reference numeral 100.

The dual channel accelerometer 100 comprises a supporting base 110, a first transducer 120, a second transducer 130 and a seismic mass 140. The first transducer 120, second transducer 130 and seismic mass 140 are co-located on the supporting base 110.

The supporting base 110 is fabricated from steel sheet, although any material having the requisite strength and stiffness properties might alternatively be used.

The seismic mass 140 is formed from steel with its mass and geometry being selected in accordance with the level of vibration which the dual channel accelerometer 100 is intended to be measuring as well as the sensitivity of the individual piezo-electric sensing elements. These selection criteria are well known in the art and are not repeated herein.

The first transducer 120 comprises a plurality of first piezoelectric elements 122 each of which is interconnected by first connectors 124. A first output channel 126 is connected to the plurality of interconnected first piezoelectric elements 122.

Likewise, the second transducer 130 comprises a plurality of second piezoelectric elements 132 each of which is interconnected by second connectors 134. A second output channel 136 is connected to the plurality of interconnected second piezoelectric elements 132.

In the present embodiment, each of the first piezoelectric elements 122 and second piezoelectric elements 132 are alternately interleaved with one another. An isolating washer (not shown) is interposed between each adjoining first and second piezoelectric elements 122,132.

The co-located first transducer 120, second transducer 130 and seismic mass 140 are secured to the supporting base 110 by the threaded fastener 150.

Each of the first piezoelectric elements 122, second piezoelectric elements 132 and seismic mass 140 has a central hole (not shown) to accommodate a threaded fastener 150. In the present embodiment the threaded fastener 150 is a threaded stud that is screwed into a correspondingly threaded hole in the supporting base 110. The first and second piezoelectric elements 122,132 and the seismic mass 140 are located on the threaded stud and secured in place by a nut and washer.

In other embodiments of the invention the threaded fastener 150 may take the form of a bolt that passes through the centre hole in each of the seismic mass 140 and the first and second piezoelectric elements 122,132. The bolt is threadingly received in a corresponding threaded hole in the supporting base 110.

A casing 160 is provided to enclose the co-located first transducer 120, second transducer 130 and seismic mass 140. The casing 160 is formed from sheet metal and is secured to the supporting base 110 by, for example, crimping, welding or brazing its edges to the supporting base 110.

Figure 4:
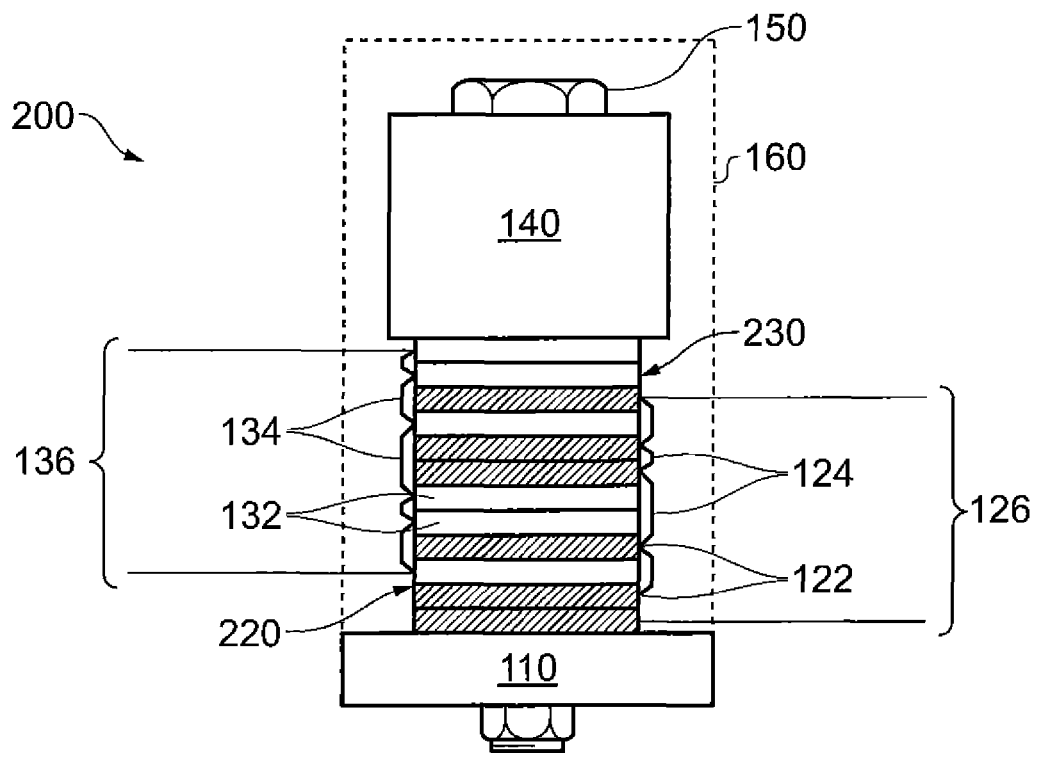
FIG. 4 shows a schematic sectional view of a dual channel accelerometer according to a second embodiment of the invention.

Referring to FIG. 4, a dual channel accelerometer according to a second embodiment of the invention is designated generally by the reference numeral 200. Features of the dual channel accelerometer 200 which correspond to those of apparatus 100 have been given corresponding reference numerals for ease of reference.

The dual channel accelerometer 200 comprises a supporting base 110, a first transducer 220, a second transducer 230 and a seismic mass 140. In a similar manner to the first embodiment of the invention described above, the first transducer 220, second transducer 230 and seismic mass 140 are co-located on the supporting base 110.

As for the first embodiment, each of the first and second transducers 220,230 comprises a plurality of respective first and second piezoelectric elements 122,132.

However, in this embodiment the first and second piezoelectric elements 122,132 are stacked onto the supporting base 110 in a 2-1-1-2 arrangement. In other words, two first piezoelectric elements 122 are initially positioned on the supporting base 110, followed by a single second piezoelectric element 132, a further single first piezoelectric element 122 and then two second piezoelectric elements 132. This 2-1-1-2 series may then itself be repeated, for example as shown in FIG. 4.

As with the first embodiment, each of the first piezoelectric elements 122 are interconnected by first connectors 124, and each of the second piezoelectric elements 132 are interconnected by second connectors 134. The interconnected first piezoelectric elements 122 provide a signal output to a first output channel 126, while the interconnected second piezoelectric elements 132 provide a signal output to a second output channel 136.

Assembly of the dual channel accelerometer 100:200 follows the same procedure for both of the first and second embodiments. The interleaved stack of first piezoelectric elements 122 and second piezoelectric elements 132 is positioned over a threaded stud which is attached to the supporting base 110. An isolating washer is placed between each pair of adjoining piezoelectric elements 122,132.

The seismic mass 140 is then positioned on the interleaved stack of first piezoelectric elements 122 and second piezoelectric elements 132. The seismic mass 140 and the first piezoelectric elements 122 and second piezoelectric elements 132 are secured to the supporting base 110 by attaching a nut to the threaded stud.

In use the dual channel accelerometer 100:200 is secured to a piece of equipment (not shown) for which it is desired to know the level of vibration experienced.

Each of the first output channel 126 and second channel 136 transmits a signal (not shown) to a signal processing apparatus (not shown) which then provides a user with a value for the level of vibration experienced by the dual channel accelerometer 100:200 and hence the piece of equipment.

The dual channel accelerometer 100:200 may be tuned by adding or removing material from the seismic mass 140.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A dual output accelerometer having first and second output channels, comprising:
    a supporting base;
    a first transducer comprising a plurality of inter-connected first piezoelectric elements;
    a second transducer comprising a plurality of inter-connected second piezoelectric elements; and
    a seismic mass,
    wherein each of the first piezoelectric elements and the second piezoelectric elements are interleaved with one another, and are co-located with the seismic mass, the co-located first and second piezoelectric elements and the seismic mass being fastened to the supporting base by a rigid mechanical coupling.

2. The dual output accelerometer as claimed in claim 1, wherein the first output channel is connected to the plurality of inter-connected first piezoelectric elements, and the second output channel is connected to the plurality of inter-connected second piezoelectric elements.

3. The dual output accelerometer as claimed in claim 1, wherein each of the first piezoelectric elements and the second piezoelectric elements are alternately interleaved with one another.

4. The dual channel accelerometer as claimed in claim 1, wherein a quantity of first piezoelectric elements is equal to a quantity of second piezoelectric elements.

5. The dual output accelerometer as claimed in claim 1, further comprising a casing fixed to the supporting base.

6. The dual output accelerometer as claimed in claim 1, wherein the seismic mass comprises the rigid mechanical coupling between the co-located first and second piezoelectric elements and the supporting base.

7. The dual output accelerometer as claimed in claim 1, wherein the rigid mechanical coupling is a threaded fastener, passing through the co-located first and second piezoelectric elements, and being threadingly connected to the supporting base.

8. A method of manufacturing a dual channel accelerometer, the method comprising the steps of:
    (i) positioning one or more first piezoelectric elements on a supporting base;
    (ii) positioning one or more second piezoelectric elements on the one or more first piezoelectric elements;
    (iii) repeating steps (i) and (ii) until a predetermined number of first and second piezoelectric elements are interleaved on the supporting base;
    (iv) positioning a seismic mass on the interleaved first and second piezoelectric elements; and
    (v) securing the first and second piezoelectric elements and the seismic mass to the supporting base by a rigid mechanical coupling.

9. The method of claim 8 further comprising first and second output channels, the method comprising the further steps of:
- (vi), inter-connecting each of the plurality of one or more first piezoelectric elements;
- (vii) inter-connecting each of the one or more second piezoelectric elements;
- (viii) connecting the one or more first piezoelectric elements to the first output channel; and
- (ix) connecting the one or more second piezoelectric elements to the second output channel.

10. The method as claimed in claim 8, wherein each of the first piezoelectric elements and the second piezoelectric elements are alternately interleaved with one another.

11. The method as claimed in claim 8, wherein the rigid mechanical coupling is integrally formed with the seismic mass.

12. A gas turbine engine comprising:
- the dual output accelerometer as claimed in claim 1, and
- an engine control system connectable to both output channels of the dual output accelerometer.

\* \* \* \* \*